E. T. BUSSIAN & H. H. NOBLE.
CARBURETER.
APPLICATION FILED OCT. 17, 1912.
1,085,194.
Patented Jan. 27, 1914.
2 SHEETS—SHEET 1.
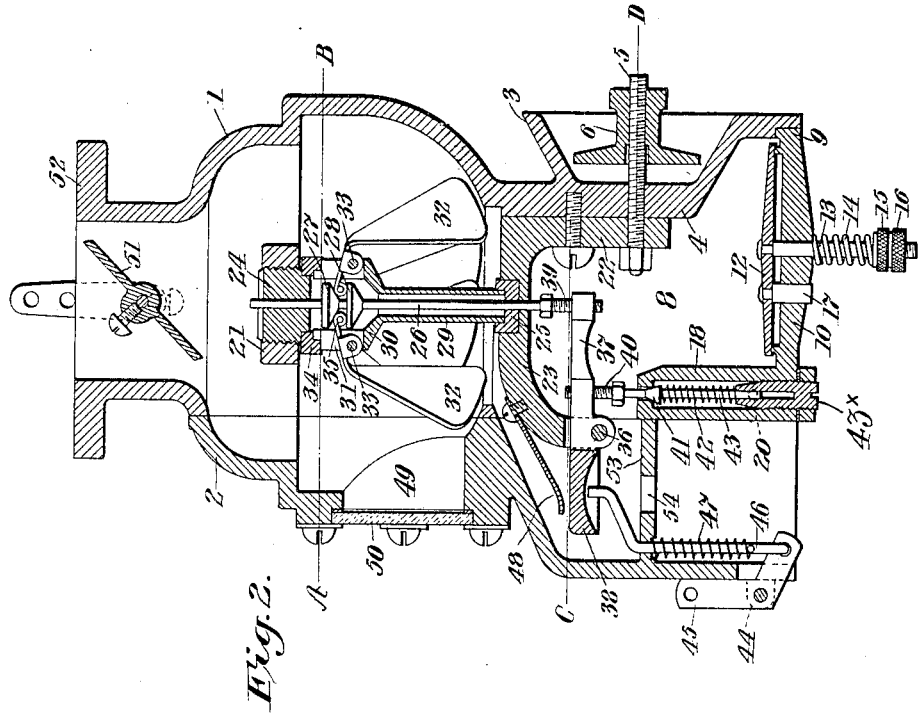
WITNESSES
INVENTORS

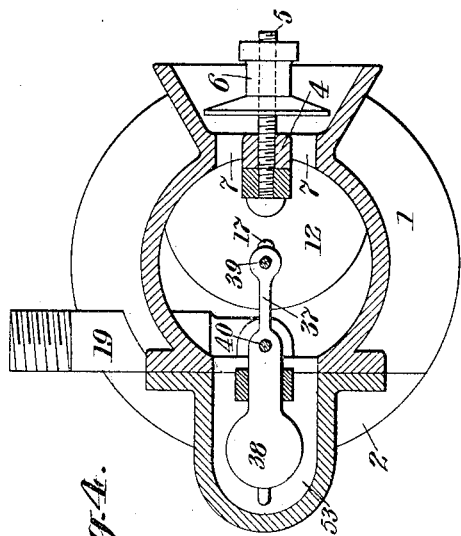
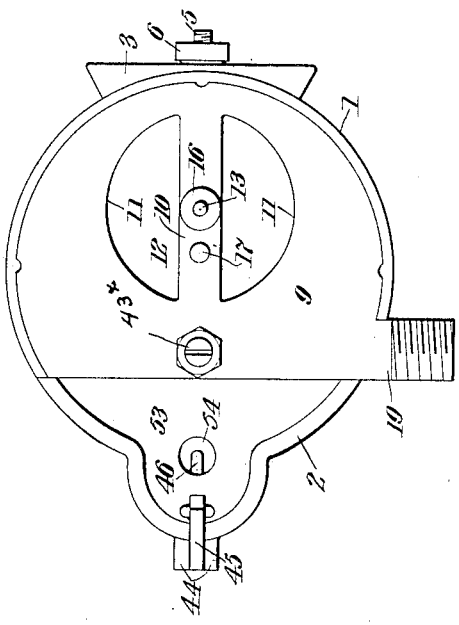
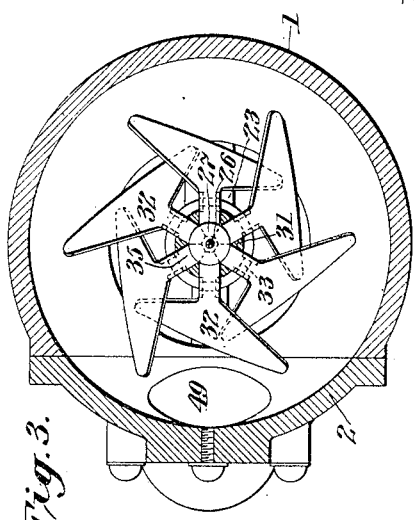

UNITED STATES PATENT OFFICE.

EMIL T. BUSSIAN AND HARRISON H. NOBLE, OF CLEVELAND, OHIO.

CARBURETER.

1,085,194.

Specification of Letters Patent. Patented Jan. 27, 1914.

Application filed October 17, 1912. Serial No. 726,391.

*To all whom it may concern:*

Be it known that we, EMIL T. BUSSIAN and HARRISON H. NOBLE, citizens of the United States, residing at Cleveland, in the county of Cuyahoga and State of Ohio, have invented a certain new and useful Improvement in Carbureters for Gas-Engines, of which the following is a full, clear, and exact description.

This invention relates to carbureters for engines using gasolene or like volatile material as the motive agent.

The object of the invention is to provide a carbureter adapted to operate efficiently without a float, and to control the air and gas admission to the mixing chamber in accordance with variations in power or speed.

The invention consists in a carbureter having adjustable primary and auxiliary air inlet valves so situated as to cause currents of air to pass into a chamber in which the spray nozzle is located and thence upward into the mixing chamber in which is arranged a fan which is caused to rotate by the currents of air, and the blades of which are pivoted so as to rise with the currents of air (the height to which they are elevated being proportional to the force of the air currents) and by such rising operate the valve of the spray nozzle to admit a predetermined quantity of gasolene or the like proportional to the amount of air admitted through the air inlet valves, which in turn, is proportional to the power or speed of the motor. The fan also serves to nebulize the gasolene and thus facilitate the mixing of the air and gasolene. Thus the fan serves a twofold purpose. We thus provide a carbureter in which the often troublesome float is unnecessary, and in which we combine a mixing fan as an immediate component part of the carbureter instead of an accessory thereto as is the common practice.

Because we are enabled to dispense with the float we herein refer to our apparatus as a floatless carbureter.

In the accompanying drawings illustrating the invention, in the several figures of which like parts are similarly designated, Figure 1 is an elevation partly broken away at the bottom and showing the gasolene feedpipe and valve in section. Fig. 2 is a longitudinal section taken at right angles to Fig. 1. Fig. 3 is a horizontal section taken in the plane of line A B, Fig. 2. Fig. 4 is a horizontal section on the broken line C D, Fig. 2. Fig. 5 is a bottom plan view.

The casing may comprise the irregular shells 1 and 2, screwed or otherwise united in a gas-tight manner. The shell 1 has the flared mouth 3 provided with the longitudinally arranged cross-bar 4 in which is fixed the screwthreaded rod 5 on which is the air-inlet valve 6, made as a nut and screwed on the rod 5 so as to be adjustable toward and from the cross-bar 4 and thus regulate the distance between itself and the cross-bar so as to increase or diminish the width of the space between itself and the openings 7, 7 on opposite sides of the cross-bar which lead into the chamber 8 in the casing.

Detachably secured in the bottom of the shell 1 is a casting 9, having the cross-bar 10, and a semicircular opening 11 (Fig. 5) at each side of it. The openings 11 are closed by a valve 12 having a stem 13 which slides in a bearing in the cross-bar 10, and surrounding this stem 13 is a coiled spring 14 the tension of which is adjusted by an adjusting nut 15 which is held in adjusted position by the jam nut 16 both of which nuts travel on the screwthreaded end of the stem 13. A guide pin 17 secured to the valve 12 and sliding in a bearing in the cross-bar 10 prevents the valve 12 and its stem 13 from turning when adjustment of the spring 14 is made. The casting 9 is provided with the spray nozzle 18, and it is also provided with the gasolene inlet pipe 19 (Figs. 1 and 4) which has the small bore 20 opening into the base of the spray nozzle 18.

Across the middle portion of the shell 1 is a cross-bar 21, and secured by bolts to the lower part of the shell 1 is a bracket 22 with arm 23. The cross-bar 21 and arm 23 have vertically alined bearings 24 and 25, respectively, in and passing through which is arranged for vertical movement a push-rod 26 having at its upper end two collars 27 and 28. Surrounding the rod 26 is a sleeve 29 carried for rotation by the bearings 24 and 25 and having at its upper end a head 30 with vertical extensions 31 between which oscillate the bearing ends of centrifugally operating fan blades 32 on pintles 33 mounted in the extensions 31. The upper ends of the extensions 31 are inclosed in a collar 34 which is fitted for rotation upon an extension of the bearing piece 24, said bearing piece being screw threaded for adjustment. The fan blades 32 have extensions 35 which coöperate with the collars 27 and 28 to move the rod 26 up and down as the fan blades move down and up under variations in the volume of incoming air.

Suspended by a pintle 36 from the inner end of the bracket arm 23 is a lever 37 having one end 38 enlarged and an adjusting screw 39 at its other end, which screw abuts against the lower end of the rod 26. Another adjusting screw 40 is screwed into the lever 37 directly above the spray nozzle 12 and this screw 40 coöperates with the upwardly extended end of a needle valve 41 held in closed position within the spray nozzle by the spring 42 surrounding its stem 43, said stem fitted in a screw plug 43ˣ which closes the bottom of the spray nozzle.

Mounted in lugs 44 on the shell 2 is a bell crank 45 having secured to its inner arm a rod 46 held down by a spring 47, and this rod extends upwardly to a position under the enlarged end of the lever 37 so that when a pull is exerted on the outer arm of the bell crank 45, the rod 46 will rise and push up the enlarged end of the lever 37 and in consequence its other end will descend and open the needle valve 41 to admit sufficient gasolene for priming purposes. A cushioning spring 48 is attached to the arm 23 above the enlarged end 38 of the lever 37 so that the upward movement of the enlarged end 38 will be cushioned and thus minimize the shock upon the delicate parts when priming.

The shell 2 is provided with a peep hole 49 covered by a glass 50 through which a view may be had of the mixing chamber.

The carbureter is provided with the usual butterfly throttle valve 51 and the flange 52 for attaching it to the intake manifold of an engine.

The space between the spray nozzle 18 and the shell 2 is closed by a horizontally extending web 53 having the air port 54 in it. The air coming through the port 54 tends to push up on the enlarged end 38 on the lever 37 and thereby helps the fan governor to push down on the gasolene valve to open it. The port 54 is quite small and would not permit sufficient air to pass through to put the carbureter out of regulation; but if there should be any trouble in this regard, it could be adjusted by means of the air inlet valve 6. It is to be understood that the air valve 12 is closed on all low speeds, while on high speeds the carbureter needs all the air it can get.

Considering the carbureter to be attached to a four-cylinder engine and its gasolene inlet connected with a source of supply, the operation is as follows:—When the engine is "turned over," the suction caused by the descent of the pistons causes air to be drawn in at the valve 6, which current of air will pass into the chamber 8 and thence upward through the mixing chamber causing the fan situated therein to rotate and this rotation will raise the blades 32 of the fan causing them to push the rod 26 downwardly against the screw 39, thus pushing down the inner end of the lever 37 and opening the needle valve 41 and allowing gasolene to flow. It is well known that the suction increases with the load or speed of the motor and the gasolene being controlled directly by this suction, the quantity of gasolene released will at all times be proportionate to the load or speed of the motor. It will be seen, therefore, that the carbureter may work efficiently without the common float, and being without that feature it is possible to tip it at any angle and yet insure as perfect operation as if set in a firm vertical position. Furthermore, there is no waste of gasolene, but there is rather a reduction in its consumption, since our carbureter automatically regulates or controls the quantity as it is needed during the varying conditions of service especially on motor cars. As even running of the motor is insured by use of this carbureter, it follows that there is a saving in wear and tear on the machine.

What we claim is:—

1. A carbureter, comprising an air inlet valve, a rotary fan the blades of which are raised by centrifugal force, said fan being operated by the air entering through said valve, a gasolene admission valve, and means interposed between said fan and valve and operated by said fan to actuate the valve and thereby control the quantity of gasolene passing the valve.

2. A carbureter for gas engines, comprising essentially air-admission means, a gasolene admission valve, a rotary fan governor having centrifugally operating fan blades, and means interposed between the governor and the gasolene admission valve to open said valve more or less according to the speed of the governor.

3. A carbureter for gas engines, comprising essentially air-admission means, a gasolene admission valve, a mixing chamber into which said means and valve open, a rotary fan governor having centrifugally operating fan blades arranged in said mixing chamber and serving to nebulize the gasolene and mix it and the air, and means interposed between the governor and said valve and operated by the governor to open the valve more or less in accordance with the speed of the governor.

4. A carbureter for gas engines, comprising essentially air-admission means, a gasolene admission valve, a rotary fan governor having centrifugally operating fan blades and means other than a float interposed between the governor and the gasolene admission valve to open said valve more or less according to the speed of the governor.

5. A carbureter for gas engines, comprising essentially air-admission means, a gasolene admission valve, a rotary fan governor having centrifugally operating fan blades, and means interposed between the governor and the gasolene admission valve to open said valve more or less according to the speed of the governor and without the intervention or use of a float.

6. A carbureter for gas engines, comprising essentially air-admission means, a gasolene admission valve, a lever for opening said valve, means to actuate said lever for priming purposes, a rotary fan governor and means interposed between said governor and lever and operated by the governor to open the valve more or less as the speed of the governor varies.

7. A carbureter for gas engines, comprising essentially air-admission means, a gasolene admission valve, a rotary fan governor, a push-rod movable longitudinally by said governor and extending into operative relation to the valve and serving to open said valve more or less in accordance with the speed of the governor to control the quantity of gasolene admitted into the carbureter without the intervention of a float.

8. A carbureter, comprising main and auxiliary air inlet valves, a rotary fan governor operated by the air entering through said valves, a gasolene admission valve and means comprising a rod and lever interposed between said fan and valve and operated by said fan to actuate the valve and thereby control the quantity of gasolene passing the valve.

9. A carbureter, comprising a stationary main air inlet valve and a pop auxiliary air inlet valve, a fan governor having blades pivotally mounted for vertical movement upon a revolving sleeve, rod and lever mechanism connected with and operated by said fan, and a gasolene inlet valve operated by said lever.

10. A carbureter, having a body portion formed of two shells, a cross-bar extending horizontally across one of said shells at its upper portion, a bracket having a horizontally extending arm secured to said shell at its lower portion, vertically alined bearings in said cross-bar and arm, a sleeve mounted to rotate in said bearings and having fan blades pivotally mounted thereon, a rod extending through said sleeve and bearings and acted upon by said fan blades whereby it is moved vertically up and down as the fan blades move down and up a lever pivotally mounted at the extremity of said horizontally extending arm, a gasolene inlet valve, and connections between said valve, lever and rod whereby the movement of said rod, caused by the fan, operates said valve and thereby controls the quantity of gasolene passing through the valve.

11. A carbureter, comprising a fan governor, a rod acted upon by said fan, a lever acted upon by said rod, a gasolene inlet valve operated by said lever, and means whereby said lever may be actuated independently of said fan and rod to supply gasolene to the carbureter for priming.

12. A carbureter, comprising a fan governor, a rod acted upon by said fan, a lever acted upon by said rod, a gasolene inlet valve operated by said lever, and means whereby said lever may be actuated independently of said fan and rod, said means composed of a spring-returned rod connected to a bell crank lever at its lower end, manual operation of said bell crank lever causing said spring-returned rod to push against said lever which in turn unseats said gasolene inlet valve to supply gasolene to the carbureter for priming.

13. A carbureter, having a rotary fan governor having centrifugally operating fan blades arranged in a mixing chamber, a gasolene inlet valve, means interposed between said fan governor and valve whereby the flow of gasolene is controlled and the ordinary float is dispensed with, and valve-controlled air inlets opening into said mixing chamber.

14. A carbureter, having a rotary fan having centrifugally operating blades arranged in a mixing chamber, a gasolene inlet valve, means interposed between said fan and valve whereby the flow of gasolene is controlled, and a peep hole in said mixing chamber to allow inspection of said fan and mixing chamber.

In testimony whereof we have hereunto set our hands this 15th day of October A. D. 1912.

EMIL T. BUSSIAN.
HARRISON H. NOBLE.

Witnesses:
 DAVID B. CARPENTER,
 JOHN M. ANDERSON.

---

Copies of this patent may be obtained for five cents each, by addressing the "Commissioner of Patents, Washington, D. C."